May 1, 1962 T. G. LEARY 3,032,265
ERROR FREE DATA INPUT SYSTEM
Filed Aug. 23, 1957
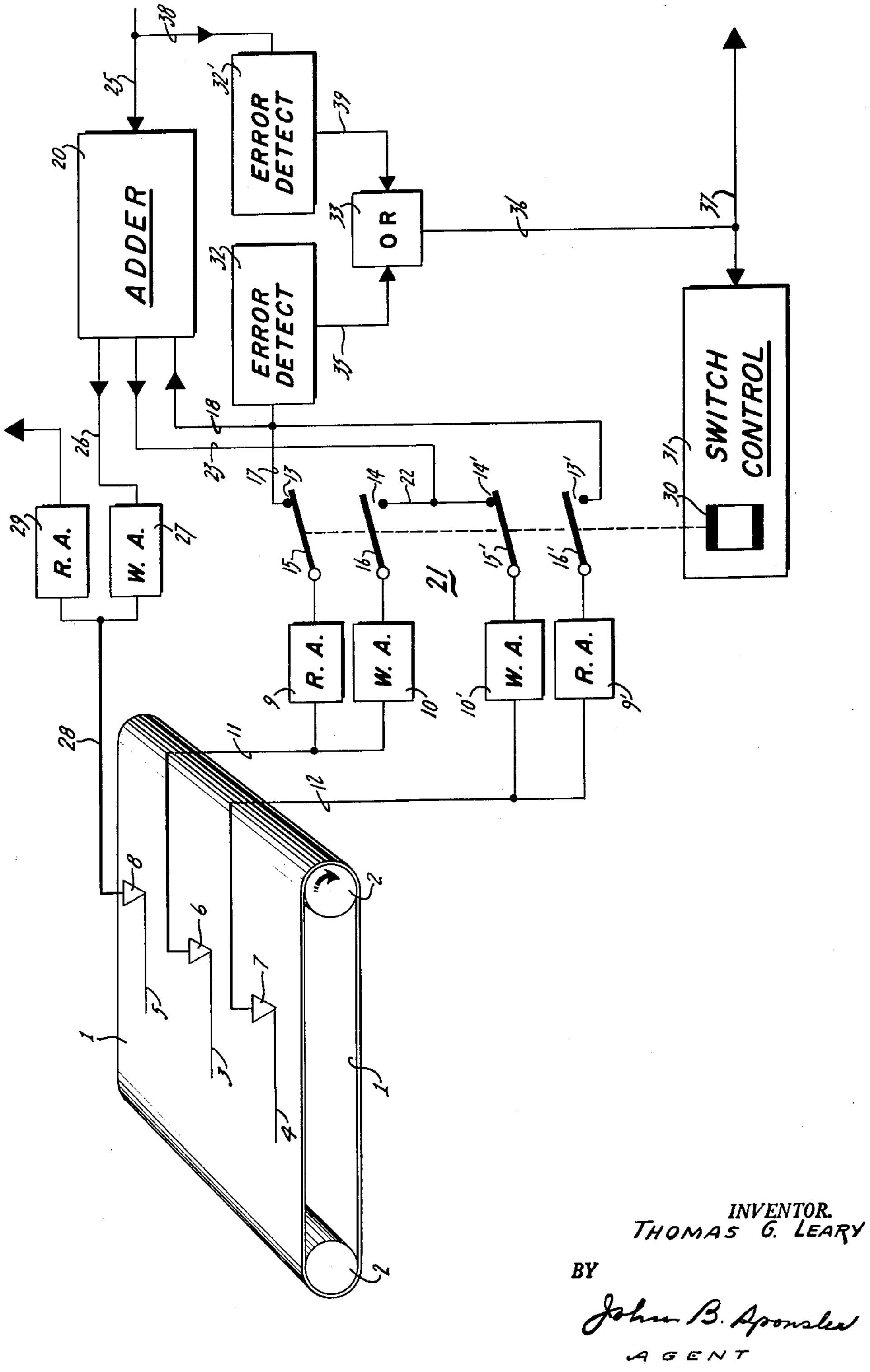
INVENTOR.
THOMAS G. LEARY
BY
John B. Aponsler
AGENT 3,032,265

ERROR FREE DATA INPUT SYSTEM

Thomas G. Leary, Santa Clara, Calif., assignor to International Business Machines Corporation, New York, N.Y., a corporation of New York Filed Aug. 23, 1957, Ser. No. 679,884
13 Claims. (Cl. 235—153)

This invention relates to error-free accounting apparatus for recording data representative of information upon a cyclic carrier such as a magnetic drum.

Conventionally in some accounting machines wherein data is recorded cumulatively upon a path or track of a rotating magnetic drum, input data from a record entry is combined in an adder with previously accumulated data and the combined data is re-recorded in the accumulator track from which all previously recorded data simultaneously is erased. It is also conventional to check for error automatically all data combined or "updated" by the adder via devices well known in the art which are not a part of this invention. In the event of an error during the adding operation, no difficulty is encountered with regard to *losing* the input data since the record is still available; however, since the previously recorded data on the accumulator track is erased at the time the new accumulated total is recorded, it may be necessary to repeat the entire previous accounting procedure in order to regain the correct sub-total in the accumulator track as it existed just before the error occurred.

According to the present invention, the combined data is not re-recorded upon the same accumulator track from which data entered the adder, but is recorded upon an alternate accumulator track. Thus, if an error is made subsequent to reading the data from the accumulator track, the recording of this erroneous information does not destroy the data on which it is based since the erroneous information is recorded on the alternate track and it is still possible to return to the original accumulator track and secure the most recent properly recorded data without having to reconstruct it.

Therefore, it is an object of this invention to provide a means for preserving recorded data against loss caused by error in updating.

It is another object of this invention to provide a simplified and economical means for preserving previously processed recorded data during the time such data is being combined with other data.

Other objects of the invention will be pointed out in the following description and claims and illustrated in the accompanying drawing which discloses, by way of example, the principle of the invention and the best mode which has been contemplated of applying that principle.

The drawing of the invention shows diagrammatically one embodiment thereof.

Briefly stated, in addition to the usual recording track or accumulator track employed to record cumulatively the results of arithmetic operations in data processing apparatus, the invention uses an alternate accumulator track upon which is recorded the data resulting from combining previously accumulated data with input data from a record entry. In this manner re-recording the combined or updated data upon the same accumulator track from which the accumulated data entered the adder is avoided. Thus, should an error be made subsequent to reading from the original accumulator track, the previous cumulative result is protected against erasure caused by the subsequent recording thereover of erroneous combined data. Consequently, prior results are maintained error free. In machines of the prior art, not being provided with such an alternate accumulator track, the erroneous combined data would be re-recorded upon the same track which previously possessed the most recent cumulative total, such re-recording simultaneously effecting a complete erasure thereof.

In addition to preserving the accumulated data against loss caused by error in combining it with input data, the combined data thus recorded upon the alternate accumulator track is itself now the most recent cumulative data recorded. As such, by a suitable switching arrangement, such as described below, for interchanging the connections between the adder and the tracks after each cycle, the combined data will be made available for further processing provided that it is free from error. Determination of its error free condition is accomplished automatically by devices well known in the art, such as those shown in U.S. Letters Patent 2,674,727 and 2,713,-084 or as disclosed in volume 29 of the Bell System Technical Journal for April 1950. The updated data must be free from error since if it is erroneous and another cycle of processing follows, the resultant combined data in such subsequent cycle will still retain the error and it will be recorded on the original accumulator track due to the cyclic interchange of connections, erasing the last previously recorded correct information.

To prevent further processing cycles from following any cycle containing an error, the switching arrangement is made responsive to the error detecting device thereby preventing the interchange of connections between adder and accumulator tracks whenever error is revealed.

Referring to the drawing, the invention comprises a cyclic magnetic recording surface shown as a magnetic tape 1 trained around a pair of end rollers 2, 2, transporting tape 1 in a predetermined direction. Tape 1 has a first and second recording track thereon, tracks 3 and 4, respectively, tracks 3 and 4 being alternate accumulator tracks, and a track 5 for receiving processed data from an adder 20.

Associated with each of tracks 3, 4 and 5 is a magnetic transducer 6, 7 and 8, respectively, of a type which can both read and record magnetically. Transducers 6 and 7 are connected through conductors 11 and 12, respectively, via suitable read and write amplifiers 9, 9' and 10, 10', respectively, to a switch arrangement generally designated by numeral 21.

Switch arrangement 21, as shown diagrammatically in the drawing, comprises an upper and a lower pair of contact arms 15, 16 and 15', 16' associated with contacts 13, 14 and 13', 14', respectively. Arms 15, 15', 16, 16' are ganged together under operational control of relay 30 (shown in its de-energized condition) associated with switch control means 31. In its normally closed position arm 15 connects transducer 6 via conductor 11, read amplifier 9, contact 13, and conductor 17 to an input conductor 18 entering adder 20. At the same time that arm 15 is in its normally closed position, arm 15' is normally closed and connecting transducer 7 via conductor 12, write amplifier 10', contact 14', and conductor 22 to an output conductor 23 leaving adder 20. Thus, in their normally closed condition arms 15 and 15' so connect adder 20 to tracks 3 and 4 as to constitute track 3 a source track for reading data therefrom into adder 20 and track 4 a receiving track for receiving combined data from adder 20.

These connections between adder 20 and tracks 3 and 4 may be interchanged by actuating relay 30. By so doing, arms 15 and 15' disconnect from their respective contacts and arm 16' connects track 4 to input conductor 18 via transducer 7, conductor 12, read amplifier 9' and contact 13', while arm 16 connects output conductor 23 to track 3 via conductor 22, contact 14, write amplifier 10, conductor 11 and transducer 6. Thus, by actuating relay 30, the condition of tracks 3 and 4 is reversed so that track 4 is now to be considered the source track rather than the receiving track and track 3 is now the receiving track rather than the source track.

Control means 31 reverses switch arrangement 21 after every cycle of operation. However, when an error, such as a parity error has been made, suitable error detecting means 32 of a conventional type, such as cited above, disables switching control means 31 thus preventing switching at such times. Detecting means 32 is shown tapped into input conductor 18 so as to be responsive to parity errors in data entering adder 20 from tracks 3 and 4. Detecting means 32 is connected via conductor 35 through a conventional OR circuit 33 and conductor 36 to switch control means 31 for disabling it during conditions of error.

In addition to error detecting means responsive to the input of the adder, additional error detecting means may be employed which are responsive to the same or different kinds of error in other portions of the circuit such as error detecting means 32′ connected to conductor 25 by conductor 38 and further arranged for disabling switch control 31 via conductor 39, OR circuit 33, and conductor 36. It is considered unnecessary to indicate further locations of such detecting means as numerous arrangements will immediately suggest themselves to those skilled in the art.

In operation, adder 20 combines accumulated data from the source track (3 or 4 depending upon the condition of means 21) with input data from a record entry received from a suitable external source via a conductor 25 leading into adder 20. Having thus updated the most recent accumulated data with input data, the combined data is then returned to the opposite track from which it came, i.e., to the receiving track. For example, as shown in the drawing, track 3 is the "source" track since it is in direct electrical connection with the input side of adder 20. Accumulated data is transmitted from "source" track 3 to adder 20 where it is adjusted to input data entering adder 20 via conductor 25, the updated data being directed to track 4. The adjusted output from adder 20 is also directed via a conductor 26, a write amplifier 27, conductor 28, and transducer 8 to track 5 from which it can be read as desired via transducer 8, conductor 28 and read amplifier 29.

Assuming that detecting means 32 determines that no errors have been made, switching means 21 is reversed by relay 30, thereby making track 4 the "source" track and track 3 the receiving track for the next cycle of operation. Had an error been made, detecting means 32 would prevent switching by disabling control 31 and track 3 would remain the "source" track, retaining thereon the most recent accurately recorded data. In this condition, it is a simple operation merely to repeat the last cycle of operation to provide the most current data, and reconstruction thereof with attendant lost time is obviated. At such times, the signal from means 32 is also directed to associated circuits via conductor 37 in order to effect a repetition of the last cycle of operation. In this manner a data input system to an adder is provided wherein accumulated data remains perpetually error free.

Obviously, the logic of this invention is just as applicable to any recording means wherein subsequent recording removes or erases prior recorded data, such as in core or electrostatic storage devices.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data recording apparatus wherein data derived from a register is combined with other data and recorded in another register, data combining means, means for connecting said registers to the input and output respectively of said combining means, and control means normally operative to alternately interchange the connections of the said registers to the said combining means.

2. In a data processing apparatus wherein data derived from a register is combined with other data and recorded in a register, data combining means, means for connecting said registers to the input and output respectively of said combining means, and control means normally operative to alternately interchange the connections of the said registers to the said combining means.

3. In a data recording apparatus wherein data derived from a register is combined with other data and recorded in another register, data combining means, means for connecting said registers to the input and output respectively of said combining means, means for detecting errors in data transmitted, and means for automatically interchanging the connections of the said registers to the said combining means in response to data free of said errors, the interchanging means being responsive to said detecting means to discontinue the normal pattern of interchange under conditions of error.

4. In a data recording apparatus wherein data derived from a register is combined with other data and recorded in another register, data combining means, means for connecting said registers to the input and output respectively of said combining means, means for detecting errors in data transmitted, and means for interchanging simultaneously the connections of the said registers to the said combining means whenever the combined data is free of said errors, the interchanging means being under control of said detecting means to the extent of preventing the normal pattern of interchange when an error is detected.

5. In a data recording apparatus wherein data derived from an accumulator is adjusted via a data processing means and the adjusted result recorded in another accumulator, means for connecting the said accumulators respectively to the input and output of the said processing means, and control means for interchanging the connections of the said accumulators to the said processing means.

6. In a data recording apparatus including a cyclic carrier having a first data storage path from which data is retrieved and combined in a data combining means with other data and the resultant combination of data recorded in a second data storage path of the said carrier, means joining the said data storage paths respectively to the input and output of the said combining means, and means for electrically interchanging the said data storage paths with respect to the said input and output respectively.

7. In a data recording apparatus including an adder, a rotating magnetic drum, transducer means for reading data from and recording data on data storage tracks of said drum, said drum having a first data storage track from which data is retrieved and combined with other data via said transducer means and said adder respectively and recorded via said transducer means in a second data storage track of the said drum, means joining the said data storage tracks respectively to the input and output of the said adder, and means for interchanging the connections of the said data storage tracks with respect to the said input and output respectively.

8. In a data recording apparatus including an adder, a rotating magnetic drum, transducer means for reading data from and recording data on data storage tracks of said drum, said drum having a first data storage track from which data is retrieved via said transducer means, an adder for combining the retrieved data with other data, means coupled to said adder and arranged to supply said other data to said adder and means for recording the resultant combination of data via said transducer means in a second data storage track of the said drum, means joining the said data storage tracks respectively to the input and output of the said adder, and means for interchanging simultaneously the connections of the said data storage tracks with respect to the said adder.

9. In a data recording apparatus including an adder, a rotating magnetic drum, transducer means for reading data from and recording data on data storage tracks of said drum, said drum having a first data storage track from which data is supplied via said transducer means to said adder and updated with other data supplied to said adder, said updated data being recorded via said transducer means in a second data storage track of the said drum, means joining the said data storage tracks respectively to an input and output of the said adder, means for detecting errors in the transmission of said data, and means for interchanging the connections of the said tracks to the said adder whenever the data has been correctly combined, the last said means being responsive to said detecting means to prevent the normal pattern of interchange.

10. A data input system comprising an adder having an input and output, a rotating magnetic drum having a plurality of data storage tracks, a transducer coacting with each said track for recording and reading data thereon, means for connecting a first of said transducers to the input of said adder for reading data from its track to be combined with other data via said adder, means for connecting the output of said adder to another of said transducers for recording the resultant combined data on its track, means for detecting errors in the transmission of said data, and means for operating both said connecting means whenever the combined data is free of said errors, said operating means being responsive to said detecting means under conditions of error to discontinue the normal connections established by said operating means thereby protecting the most recently recorded accurate information from erasure.

11. In a data processing machine wherein data derived from an accumulator is updated with other data via an adder having an input circuit and an output circuit and the updated resultant data recorded in another accumulator, a data storage system for handling data comprising a first accumulator, a second accumulator, a switching means arranged operatively between the adder and said first and second accumulators, said switching means being alternately operative first to couple said first accumulator to said input circuit while coupling said second accumulator to said output circuit and second to couple said second accumulator to said input circuit while coupling said first accumulator to said output circuit, and an error detecting means operatively associated with said adder, said detecting means being further controllably associated with said switching means to prevent alternate operation thereof under conditions of error.

12. In a data processing machine wherein data derived from an accumulator is combined with other data via an adder having an input circuit and an output circuit and recorded in another accumulator, a data storage system for handling data comprising a first accumulator, a second accumulator, transducer means for reading from and writing into each of said accumulators, a switching means arranged operatively between the adder and said first and second accumulators, said switching means being alternately operative first to couple said first accumulator via said transducer means to said input circuit while coupling said second accumulator via said transducer means to said output circuit and second to couple said second accumulator via said transducer means to said input circuit while coupling said first accumulator via said transducer means to said output circuit, and an error detecting means operatively associated with said adder, said detecting means being further controllably associated with said switching means to prevent alternate operation thereof under conditions of error.

13. In a data recording apparatus wherein data derived from a register is combined with other data and recorded in a register, data combining means, first means for connecting a register to the input of said combining means, and second means for connecting a register to the output of said combining means, means for detecting transmitted errors, and means for operating both said connecting means whenever the combined data is free of said errors, said operating means being responsive to said detecting means under conditions of error to interrupt the normal connections established by said operating means thereby protecting the most recently recorded accurate information from erasure.

References Cited in the file of this patent

UNITED STATES PATENTS

| | | |
|---|---|---|
| 2,611,813 | Sharpless et al. | Sept. 23, 1952 |
| 2,721,990 | McNaney | Oct. 25, 1955 |
| 2,789,759 | Tootill et al. | Apr. 23, 1957 |